United States Patent [19]

Klemann et al.

[11] Patent Number: 5,139,807
[45] Date of Patent: Aug. 18, 1992

[54] AMIDE LINKED LOW CALORIE FAT MIMETICS

[75] Inventors: Lawrence P. Klemann, Somerville; John W. Finley, Whippany; Ronald G. Yarger, Convent Station, all of N.J.

[73] Assignee: Nabisco, Inc., Parsippany, N.J.

[21] Appl. No.: 626,845

[22] Filed: Dec. 13, 1990

[51] Int. Cl.$^5$ .............................. A23L 1/09; C09F 5/00
[52] U.S. Cl. .................................. 426/531; 426/601; 426/611; 554/57; 554/58; 554/63; 554/106; 554/107; 554/110; 554/223; 554/227
[58] Field of Search ............... 426/601, 531, 611, 804; 260/404, 404.5

[56] References Cited

U.S. PATENT DOCUMENTS

| | | |
|---|---|---|
| 2,962,419 | 11/1960 | Minich . |
| 3,600,186 | 8/1971 | Mattson et al. . |
| 4,508,746 | 4/1985 | Hamm . |
| 4,888,195 | 12/1989 | Huhn et al. . |
| 5,045,338 | 9/1991 | Klemann et al. ............... 426/611 |

FOREIGN PATENT DOCUMENTS 1106681 8/1981 Canada .

OTHER PUBLICATIONS

Ward, Gros, and Geuge; New Fat Products: Glyceride Esters of Adipic Acid; *JAOCS*; vol. 36, 1959, p. 667.

D. J. Hamm; Preparation and Evaluation of Trialkoxytricarballylate, Trialkyoxycitrate, Trialkoxyglyceryl Ether, Jojoba Oil, and Sucrose Polyester as Low Calorie Replacements of Edible Fats and Oils; *J. of Food Science*; vol. 49, 1984, pp. 419–426.

*Primary Examiner*—Joseph Golian
*Assistant Examiner*—Leslie Wong

[57] ABSTRACT

Novel fat mimetic compositions are disclosed to be useful in reduced calorie foods. These compounds, which can be referred to as amide linked fat mimetics, consist of fragments bearing ester, ether, and/or amide groups joined by an aliphatic or alicyclic group through at least one amide linkage. These complex amide linked fat mimetics may be partially broken down in the body to produce digestion residues which are substantially nondigestible themselves and are sufficiently hydrophilic to enable the digestion residues to be incorporated in the normal stool. These fat mimetic compounds are useful as replacements for fats and oils for most food applications.

22 Claims, No Drawings

AMIDE LINKED LOW CALORIE FAT MIMETICS

BACKGROUND OF THE INVENTION

The present invention relates to edible fat mimetic materials, and especially to new compounds which have a desirable combination of properties, and their use in edible compositions.

Obesity is perceived as a common problem in contemporary society. This condition is due, in many people, to a greater intake of calories than are expended. While genetic and behavioral factors play a major role, it is generally agreed that reasonable modifications of the caloric value of foods can be valuable in reaching a more desirable equilibrium weight for an individual predisposed to obesity.

Many foods which provide gustatory satisfaction contain significant fat levels. This can be a problem for individuals drawn to these foods because fat has about twice the caloric density of protein and carbohydrates. Estimates indicate, in fact, that fat contributes about 40% of the total calories in the diet. It has long been desired to reduce the available calories of dietary fat without decreasing the appeal or satiety expected of fatty foods. This would, it has been reported, offer a convenient and practical method by which obesity could be controlled, ideally without requiring a dieter to restrict total food intake.

Unfortunately, of the materials heretofore suggested as fat replacements, few have all of the desirable attributes of natural triglyceride fats and oils, although several patents disclose edible compounds which are not digested or absorbed t the same extent as natural triglycerides. U.S. Pat. No. 2,962,419, to Minich discloses that fatty acid esters which contain a neopentyl nucleus are not digested like normal fats and thus can be used as fat substitutes in food compositions. And, in U.S. Pat. No. 3,600,186, Mattson and Volpenhein disclose sugar and sugar alcohol fatty acid esters having at least four fatty acid ester groups. All of these compounds are said to possess physical properties similar to ordinary triglyceride fat, but are absorbed less readily when eaten. It is, unfortunately, this very attribute which causes undesirable and potentially embarrassing side effects, including the frank anal discharge of the materials.

In a greater departure from conventional glyceride ester chemistry, Canadian Patent 1,106,681 to Trost discloses glycerol dialkyl ether compounds which are said to have functional properties similar to those of conventional fats, but which are not absorbed in the digestive tract to any significant degree. Also, Ward, Gros, and Geuge have reported in New Fat Products: Glyceride Esters of Adipic Acid, JAOCS, Vol. 36, 1959, page 667 that highly viscous oils formed by reacting two glycerol molecules with a dibasic acid, such as fumaric, succinic, and adipic acids, and then reacting one of the hydroxyl groups of each glycerol moiety with a fatty acid, are useful in the food industry, primarily as lubricants and coatings.

In U.S. Pat. No. 4,508,746, Hamm discloses a low-calorie substitute for at least a portion of the edible oil component in oil-based food compositions, which low-calorie substitute is comprised in substantial proportion of at least one low-calorie oil component selected from the group consisting of thermally stable polycarboxylic acids having 2 to 4 carboxylic acid groups esterified with saturated or unsaturated alcohols having straight or branched carbon chains of from 8 to 30 carbon atoms. See, also, D. J. Hamm, Preparation and Evaluation of Trialkoxytricarballylate, Trialkyoxycitrate, Trialkoxyglycerylether, Jojoba Oil, and Sucrose Polyester as Low Calorie Replacements of Edible Fats and Oils, *J. of Food Science*, Vol. 49, 1984, pages 419–426.

In a recent teaching, Huhn, Given, Jr., and Klemann disclose ether bridged polyester compositions in U.S. Pat. No. 4,888,195. These compositions have mono or multibasic acid moleculer joined by an ether bridge, with straight or branched chain alcohols esterified to the free carboxyl groups of the acid molecules.

One of the main problems in attempting to formulate fat-like compounds that have decreased absorbability and thus low caloric properties is to maintain the desirable and conventional physical properties of edible fat. Thus, to be a practical low calorie fat, a compound must mimic conventional triglyceride fat by affording the same utility in various fat-containing food compositions such as shortening, margarine, cake mixes, and the like, and be useful in frying or baking. Unfortunately, none of the prior attempts has yet been successful to the degree that commercial products employing them have either been approved for safety or achieved general public acceptance in their featured role.

Among the problems with many non-absorbable synthetic fat-like materials is the possibility that they will leach fat-soluble vitamins and minerals from the body and that they function, when used in larger amounts as purgatives. In addition, the synthesis of such materials is often complex and impractical from a commercial standpoint. Many attempts have been made to solve these and related problems; however, a better solution would employ chemistry more compatible with the human digestive process which can be simpler synthetically while providing a significant decrease in caloric density vis-a-vis glyceride fats.

SUMMARY OF THE INVENTION

The present invention provides a new class of fat mimetic compounds, new food compositions which contain them, and the process of employing these compounds in food compositions. These compositions, which are here referred to as amide linked fat mimetics, consist of linked fragments joined by an aliphatic or alicyclic group through at least one amide linkage.

Advantageously, the inventive fat mimetics, because they can be synthesized using useful starting materials such as amino acids and alkanolamines, have a desired simplicity of assembly, and they break down predictably to normal metabolic products. In fact, the particular starting materials can be selected for their functional or nutritional properties. These complex amide linked fat mimetics may be partially broken down in the body to produce digestion residues which are substantially non-digestible themselves and are sufficiently hydrophilic to enable the digestion residues to be incorporated in the normal stool. These fat mimetic compounds are useful as replacements for fats and oils for most food applications.

The compounds are employed in any edible material or any food preparation process where a fat or oil (i.e., triglyceride fat) is normally employed, in total or partial replacement.

By judicious selection of the structural type, molecular size and the number of acid residues, it is possible to achieve a target reduction in calories while preferably achieving the maximum advantage from the combination of the properties of these mimetics.

DETAILED DESCRIPTION

The following description relates to a new class of fat mimetic compounds and their incorporation into any food product or use in conjunction with any edible material. The term "edible material" is broad and includes anything edible, whether or not intended for nutrition, e.g., it can be an additive such as an antioxidant for fats or oils, an antispatter agent, an emulsifier, or other minor functional ingredient. Thus, chewing gum, flavored coatings, oils and fats intended only for frying, and the like are included. In these, all or a portion of the usual fat is replaced by a compound of the invention.

Representative of food products which can contain the fat mimetic compounds of the invention in full or partial replacement of natural fat are: frozen desserts, e.g., sherbert, ice cream, ices, or milk shakes; puddings and pie fillings; margarine substitutes or blends; flavored bread or biscuit spreads; mayonnaise; salad dressing, both emulsified and non-emulsified; filled dairy products such as filled cream or filled milk; dairy or non-dairy cheese spreads; peanut butter; egg substitutes; coffee lighteners, liquid and dried; flavored dips; frying fats and oils; reformed and comminuted meats; meat substitutes or extenders; whipped toppings; compound coatings; frostings and fillings; cocoa butter replacements or blends; candy, especially fatty candies such as containing peanut butter or chocolate; chewing gum; bakery products, e.g., cakes, breads, rolls, pasteries, cookies, biscuits, or savory crackers; mixes or ingredient premixes for any of these; as well as flavor, nutrient, drug, or functional additive delivery systems.

The fat mimetics of the invention can also be employed in margarine substitutes which can be either soft or hard. Margarines are generally sold as one of two principal types: namely, (1) print, hard or stick margarine and (2) soft or tub margarine. All of these products contain liquid and hard stock components which can be replaced by fat mimetics of the invention. It is an advantage of the present invention that, by eliminating some or all of the hard stock of conventional margarines, higher ratios of polyunsaturated to saturated fatty acids and lesser amounts of trans isomers can be achieved in high quality margarine products.

The fat mimetic compounds of the invention will be referred to herein as "amide linked fat mimetics" and can be defined by the following general formula:

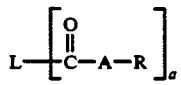

wherein

L is a substituted or unsubstituted aliphatic or alicyclic group having 1 to 8 carbons;

each A is, independently, NQ or oxygen (where at least one A is NQ);

each R is, independently, a residue defined by the formula —BR'$_b$;

a is 2 to 8;

where each b is, independently, 1 to 17, preferably 1 to 5;

each Q is, independently, an aliphatic group, preferably having 1 to 6 carbons, or hydrogen;

each B is, independently, a straight, branched-chain or cyclic backbone chain having from 2 to 8 carbons;

each R' is, independently, —(CO)—A'—R" or —A'—(CO)—R" or —O—R";

each R" is, independently, an aliphatic group having 1 to 30 carbons, —CH(CH$_3$)CH$_2$O—R''' or —CH$_2$CH(CH$_3$)O—R''', where R''' is an aliphatic group having 1 to 30 carbons; and each A' is, independently, NQ or oxygen, where Q is as defined above.

More preferably, each R group will contain from 1 to 3, most desirably 2, R' radicals.

As noted, L, which is the linking group through which the ester-, ether-, and/or amide-bearing fragments are joined, is a substituted or unsubstiuted aliphatic or alicyclic group having 1 to 8 carbons. By "aliphatic" is meant a straight- or branched-chain organic group composed of paraffins, olefins, and acetylenes, especially paraffins. By "alicyclic" is meant a closed ring organic group composed of cycloparaffins, cycloolefins, and cycloacetylenes, especially cycloparaffins. These alipathic or alicyclic groups can be substituted with, for instance, hydroxyl groups or 1 to 30 carbon aliphatic groups such as fatty acid or fatty alcohol residues.

B, which is the backbone chain of the fragments joined through L (through at least one amide linkage) is a straight, branched-chain, or cyclic organic group which can be visualized as a hydrocarbon to which is attached at least one oxygen or nitrogen. For ease of synthesis, amino acid groups can be utilized as backbone chain B with at least one amino group used to link B with linking group L, and the carboxyl group(s) (as well as any remaining amino groups) used for attachment of aliphatic groups R". In addition, B can be a cyclic organic group, such as a saccharide like fructose or chitin.

Where R' groups are of the formula

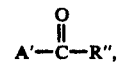

they can be fatty acid residues which are preferably derived from natural fat. The term "fatty acid" used here means an organic fatty acid of the formula RCOOH containing 2 to 30 carbons, and may be synthetic or natural, saturated or unsaturated, with straight or branched chains. Examples of fatty acids are acetic, propionic, butyric, caproic, caprylic, capric, undecanoic, lauric, myristic, palmitic, margaric, stearic, arachidic, behenic, lignoceric, cerotic, montanic, mellissic, palmitoleic, oleic, vaccenic, linoleic, linolenic, oleostearic, arachidonic, nervonic, eicosapentaenoic, decosatetraenoic, decosapentaenoic, decosahexaenoic, and the like acids. Mixtures of fatty acids may also be used, such as those derived from non-hydrogenated, partially hydrogenated or fully hydrogenated soybean, safflower, sunflower including high oleic sunflower, sesame, peanut, corn, olive, rice bran, canola, babassu nut, coconut, palm, palm kernel, lupin, nasturtium seed, mustard seed, cottonseed, rapeseed including low erucic rapeseed, butter or marine oils, or plant waxes such as jojoba. Specific fractions of natural or processed oils or waxes may also be used.

Fatty acids per se or naturally-occurring fats and oils can serve as the source for the fatty acid component in the inventive complex amide linked ester. For example, rapeseed oil is a good source of C$_{22}$ fatty acids. C$_{16}$—C$_{18}$ fatty acids can also be provided by tallow, soybean oil, or cottonseed oil. Shorter chain fatty acids can be provided by coconut, palm kernel, or babassu oils. Corn oil, lard, olive oil, palm oil, peanut oil, safflower seed oil, sesame seed oil, and sunflower seed oil, are examples of other natural oils which can serve as the source of the fatty acid component. Among the fatty acids, those utilized often include acids selected from the group consisting of myristic, palmitic, stearic, oleic, and linoleic. Thus, natural fats and oils which have a high content of these fatty acids represent preferred sources for the fatty acid components, e.g., soybean oil, olive oil, cottonseed oil, corn oil, tallow, and lard. Advantageously, the fatty acids utilized are selected to provide the desired fatty characteristics to the fat mimetic compound.

Where the R' groups are of the formula

or —O—R", they can be residues of fatty alcohols having saturated or unsaturated aliphatic groups. The term "fatty alcohols" used here means an alcohol of the formula $RCH_2OH$. The fatty alcohol may be synthetic or natural, saturated or unsaturated, with straight or branched chains, and of the same chain length and configuration as the fatty acids discussed above, namely, derived from fatty alcohols having 2 to 30 carbon atoms. Examples of fatty alcohols include the fatty alcohol counterparts of the fatty acids enumerated above, namely, ethyl, propyl, butyl, hexyl, octyl, pelargonyl, capryl, lauryl, undecanyl, myristyl, palmityl, stearyl, arachidyl, behenyl, lignoceryl, cerotyl, montanyl, melissyl, palmitoleyl, oleyl, vaccenyl, linoleyl, linolenyl, oleostearyl, arachidyl, nervonyl, eicosapentaenyl, docosatetraenyl, docosapentaenyl, and docosahexaenyl alcohols. Mixtures of fatty alcohols may also be used, such as those obtained from the processed or unprocessed natural oils or waxes enumerated above, or specific fractions of the oils or waxes.

The particular types of fatty acids and alcohols can be selected to achieve the desired texture (both solid and liquid) and melt characteristics in the compound. In fact, certain of the inventive amide linked fat mimetics can be a liquid, yet upon hydrolysis produce at least some solid fragments. Exemplary of such compounds are those having alkyl side chain (12), as disclosed hereinbelow. These fat mimetics, thus, have all of the desirable properties of oils yet have reduced calories. Moreover, since at least some of the hydrolyzed fragments are solid, they can be used to reduce or prevent the frank anal discharge (i.e., anal leakage) which has been observed after the ingestion of some liquid fat mimetic compounds. This is especially useful where the fat mimetic compounds being ingested include sucrose polyesters, whose persistent anal leakage is notorious.

The amide linked fat mimetics of this invention may be incorporated either alone, or in combination with another fat and/or fat mimetic, into any food composition or used in conjunction with any edible material. Other fat mimetics include any heretofore suggested edible fat replacements, including, but not limited to, sugar esters, neoalkyl esters, polyglycerol esters, malonate esters, propoxylated glycerols, retrofats, silicone oils/siloxanes, carboxy/carboxylates, and the like. These blends or combinations can be selected for a desired rheology, melt profile, and mouthfeel. This is especially desirable in the case of margarine substitutes, cookie fillings, whipped toppings, etc.

Among the complex amide linked fat mimetics preferred for many applications are those with melting points below about 98° F. because these materials melt in the mouth, providing the organoleptic sensation of natural fats and oils. For some products, relatively sharp melting points, for instance in the range of from about 90° F. to about 98° F., are desired because they provide a cooling sensation and a meltdown equivalent to high quality, solid, natural fats.

The inventive amide linked fat mimetics may be partially broken down in the body to yield digestion residues which, preferably, are each more hydrophilic than the complex amide linked substrate. The majority by weight of the digestive residues will be non-hydrolyzable by normal digestive processes, while a minor amount by weight may be susceptible to facile cleavage by the action of digestive enzymes. The selection of the exact type of chemical bonds which will provide the desired proportions of hydrolytically reactive versus "inert" sites can be readily determined by experiment.

The fat mimetic compounds of the present invention include those of the general formula:

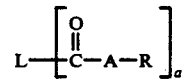

where

L is an aliphatic or alicyclic linking group having from 1 to 8 carbons. Although L is preferably unsubstituted, it can be substituted, such as with hydroxyl groups, aliphatic groups having 1 to 30 carbons, etc. For convenience, L may be envisioned as a simple aliphatic or alicyclic chain;

at least one A is NH, and the other either NH or O; a is 2; and each R is, independently, selected from the group consisting of

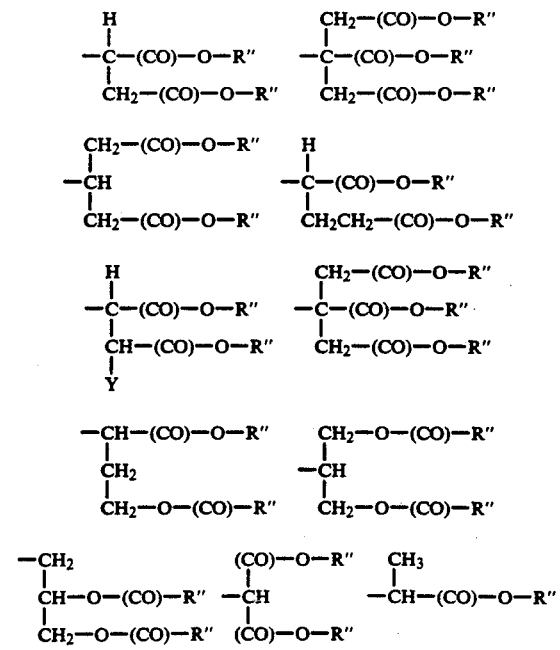

-continued
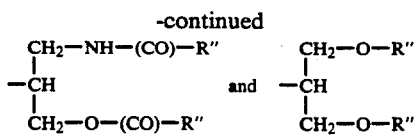
where R" is as defined above, and Y is —O—(CO)—R", or —(CO)—O—R" (it will be recognized that —(CO)— is representative of a carbonyl group.
Among the compositions of this invention are those which can be defined as symmetric amide bridged structures (i.e., those wherein each R is the same, although comprising either one or two amide linkages) as follows:
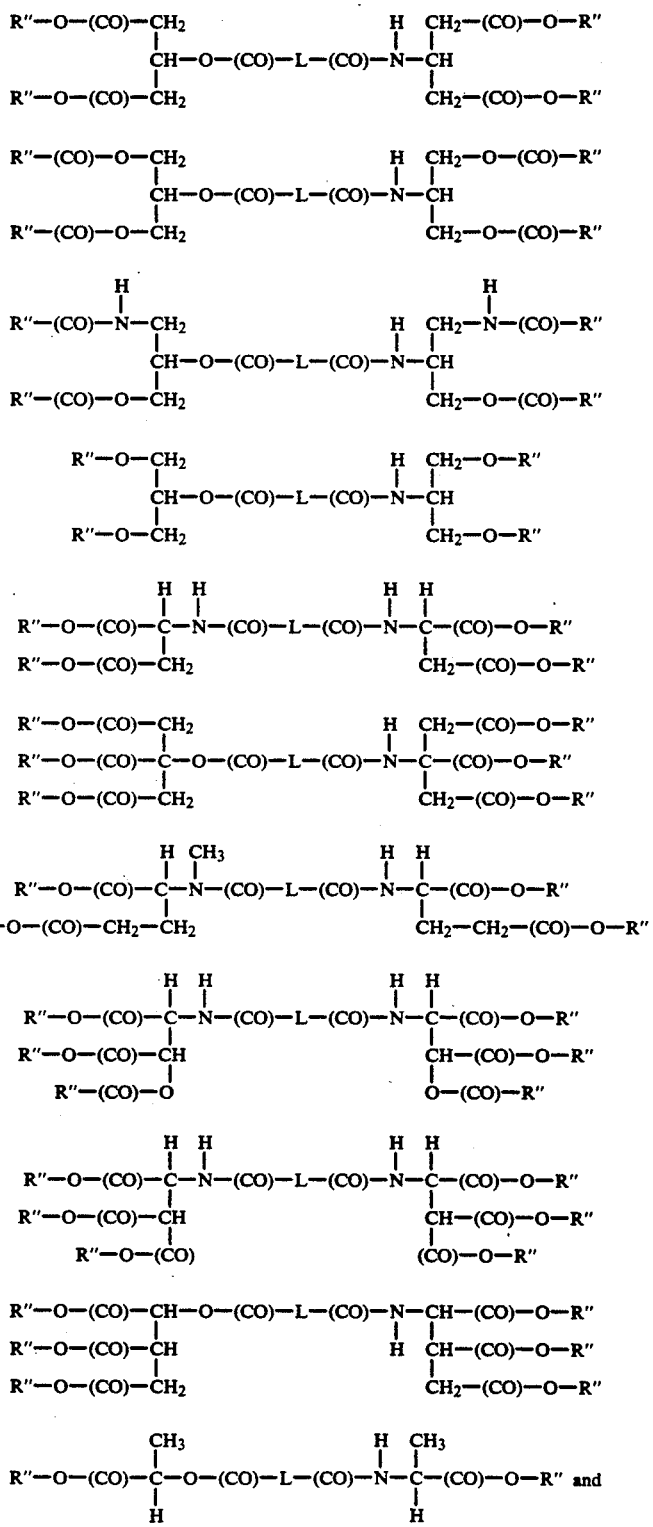

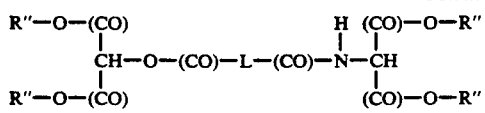
and asymmetric amide bridged structures (i.e., those wherein each R is different, also comprising either one or two amide linkages) as follows:
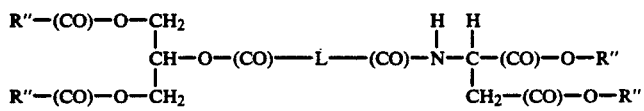
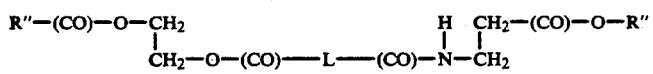
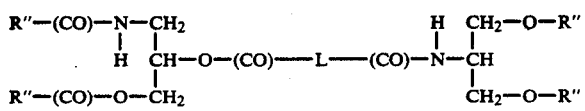
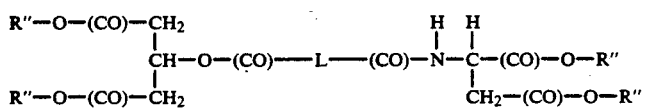
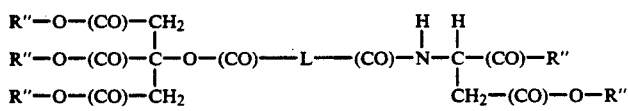
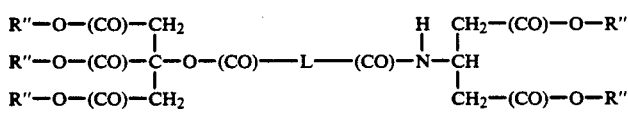
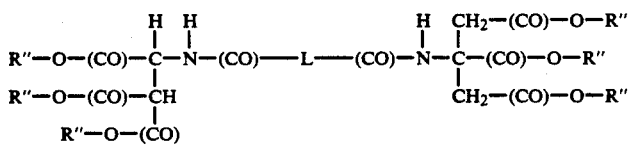
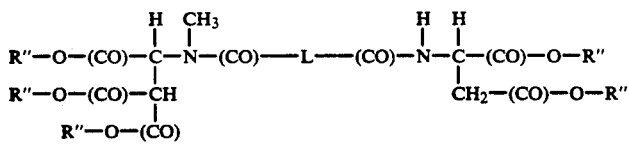
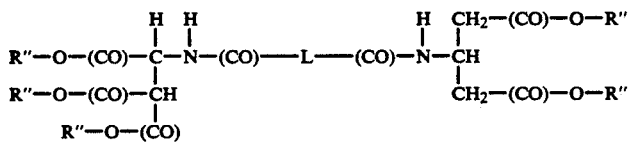
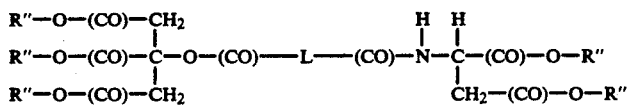
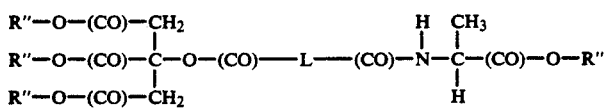

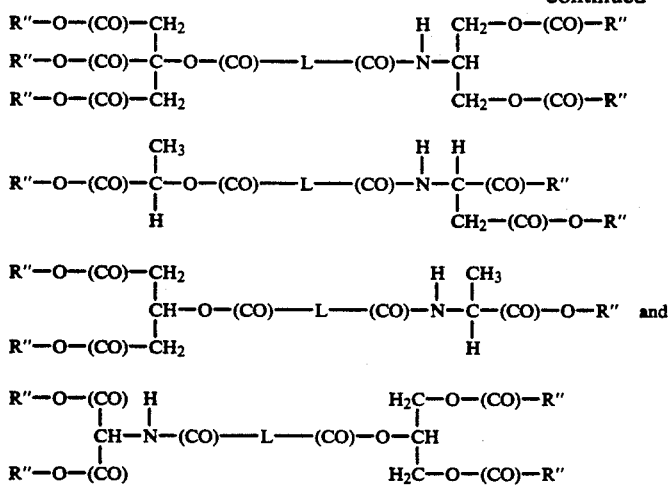
wherein L is a substituted or unsubstituted aliphatic or alicyclic group having 1 to 8 carbons; and each R", independently, is an aliphatic group having 1 to 30 carbons.
The following is a list of representative, but non-limiting, examples of R groups which can be linked to form the complex amide linked fat nimetics of the invention:
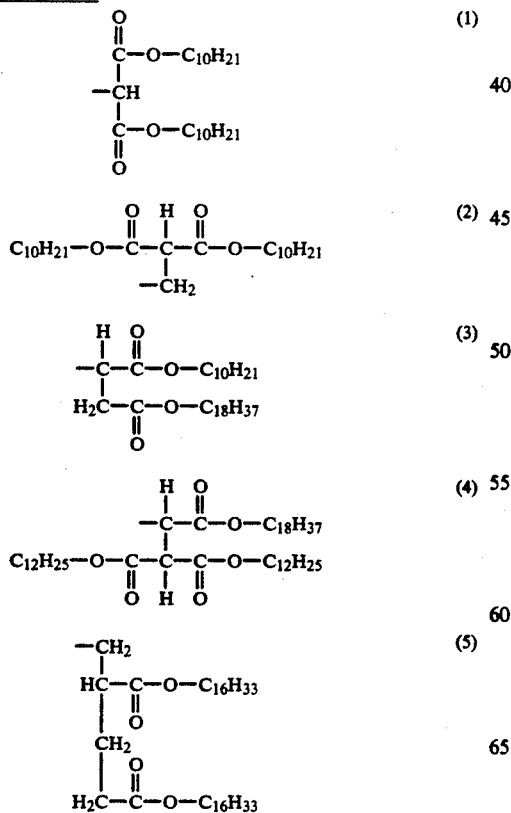
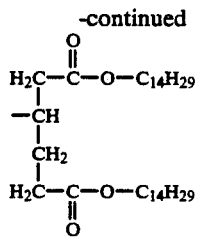
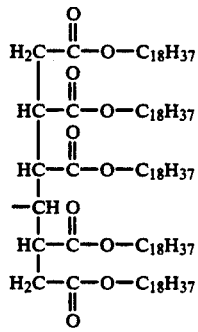
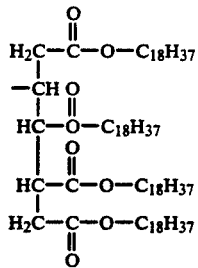
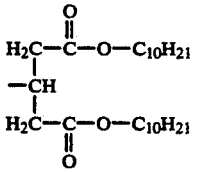
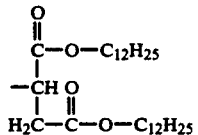

-continued
(11) 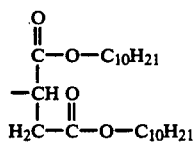
(12) 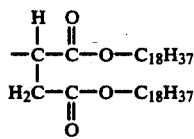
B. Alkenyl Side Chains
(13) 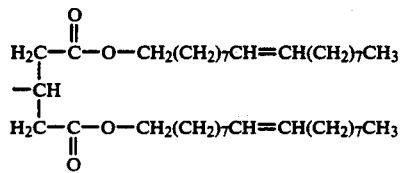
(14) 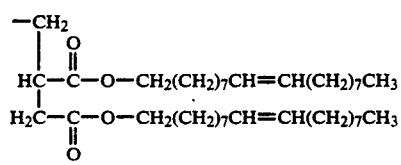
(15) 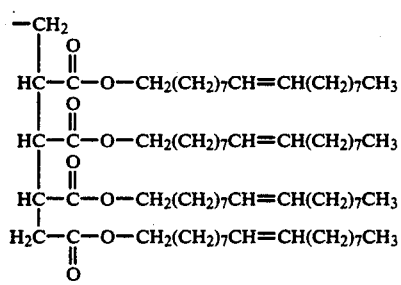
C. Mixed Alkyl/Alkyenyl Side Chains
(16) 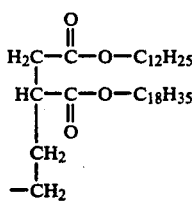
(17) 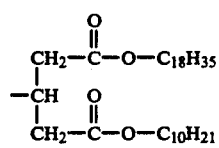
D. Miscellaneous Side Chains
(18) 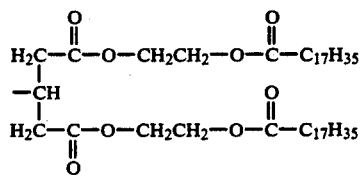
-continued
(19) 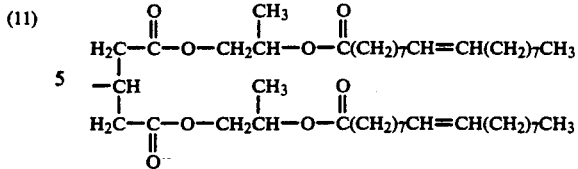
II. Normal Ester Linkages
A. Alkyl Side Chains
(20) 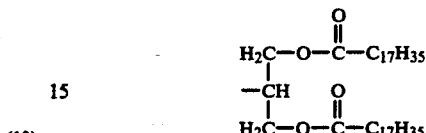
(21) 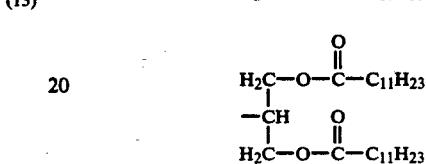
(22) 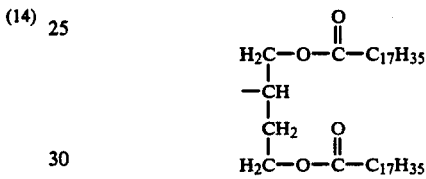
(23) 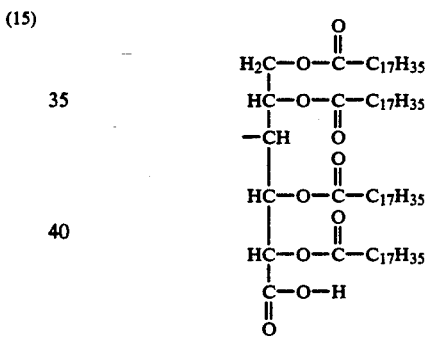
B. Alkenyl Side Chains
(24) 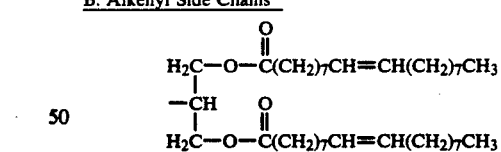
(25) 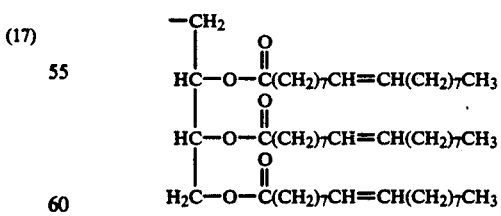
C. Alkyl/Alkenyl Side Chains
(26) 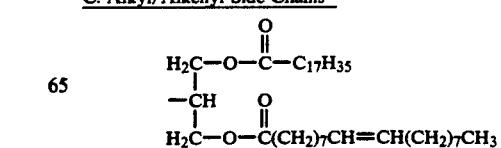

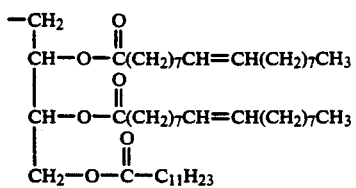 (27)
III. Normal Ester/Reverse Ester Linkage
A. Alkyl Side Chains
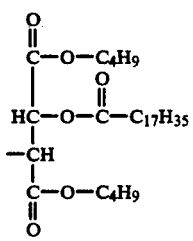 (28)
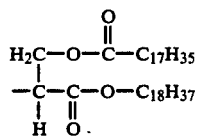 (29)
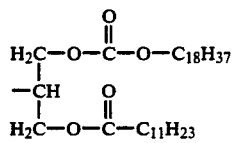 (30)
B. Alkenyl Side Chains
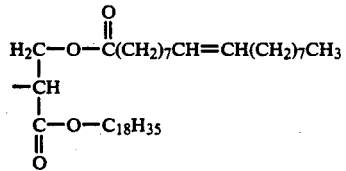 (31)
C. Mixed Alkyl/Alkenyl Side Chains
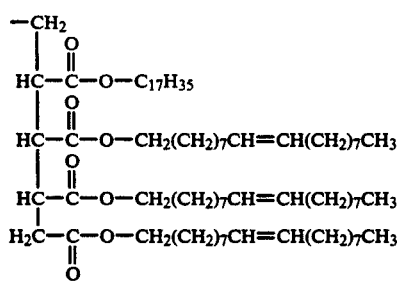 (32)
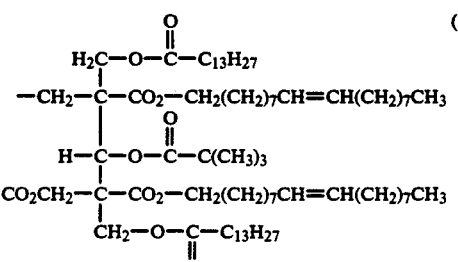 (33)
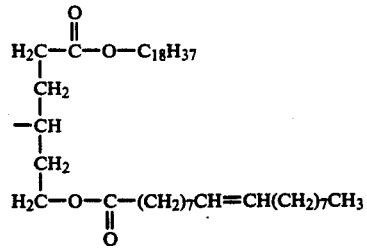 (34)
III. Ether Linkages
A. Ether Linkages Alone
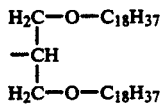 (35)
B. Mixed Ether/Ester Linkages
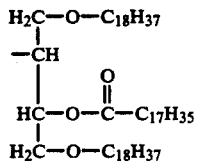 (36)
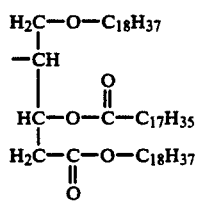 (37)
 (38)
IV. Amide Linkages
A. Amide Linkages Alone
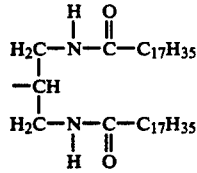 (39)
B. Mixed Amide/Ester Linkages
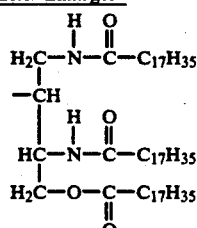 (40)
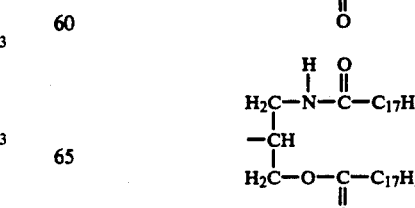 (41)

-continued

C. Mixed Amide/Ether Linkage

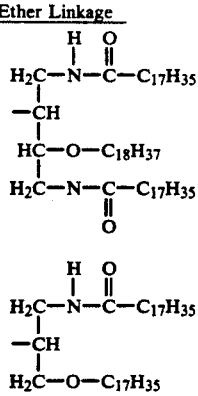

The preparation of the complex amide linked fat mimetics of the invention involves the reaction of complex alcohols or acids of the formula R'OH (such as, for instance, 2-hydroxyglutarate diester, 3-hydroxyglutarate ester, 2-hydroxysuccinate diester, 1-hydroxy-1,2,3-tricarboxy propane, 2-hydroxy-1,2,3-tricarboxy propane, propanolamine, 2-amino-1-butanol, etc.), or R'—(CO)—OH (such as, for instance, essential and non-essential amino acids such as aspartic acid, isoleucine, lycine, etc.) with a polybasic compound effective to link the R' radicals to a common molecular framework. Among the polybasic compounds are: polybasic compounds of the formula

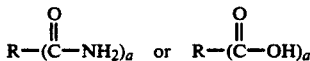

acid chlorides of the formula

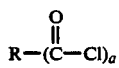

alkyl amides or esters of the formula

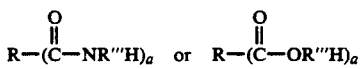

dibasic acid cyclic anhydrides or amides of the formula

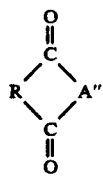

or mixed anydrides or imides of a dibasic acid such a shown by the formula

wherein R, R', R''' are as defined above, a is 2 to 8, and A'' is NQ or O, where Q is as defined above. The reactions will typically proceed at approximately ambient or reduced pressure and at temperatures of from about 0° C. to 190° C. Solvents and/or catalysts may be employed to adjust the reaction rate and product recovery as desired.

Representative dibasic acids are saturated acids such as oxalic, malonic, succinic, glutaric, adipic, and unsaturated acids such as maleic, fumaric, citraconic, mesaconic, glutamic, aspartic, sebacic, and suberic. Representative of tribasic acids are citric, tricarballylic, cis, cis-1,3,5-cyclohexanetricarboxylic, cis-aconitic and trans-aconitic acids. Representative tetrabasic acids are methane tetracarboxylic acid and 1,1,2,2-ethane tetracarboxylic acid. Suitable anhydrous acid chloride, acid bromide, and lower alkyl ester forms of these acids can be employed as desired.

The following examples are presented to further illustrate and explain the present invention and should not be taken as limiting in any regard. Unless otherwise indicated, all parts and percentages are by weight.

EXAMPLE 1

This example shows the preparation, from intermediates to final molecular composition, of a fat mimetic material of the invention, having the following structure:

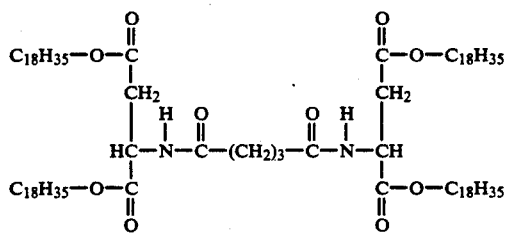

Dioleyl N-alpha-tertiary-butyloxycarbonyl aspartate

N-alpha-tertiary-butyloxycarbonyl aspartic acid (91.64 g, 0.4 mole) and dicyclohexylcarbodiimide (245.4 g, 1.2 mole) are combined in a mixture of 2000 mL dichloromethane and 630 mL dimethylformamide. 4-Dimethylaminopyridine (88.4 g, 0.72 mole) is then added, followed by oleyl alcohol (242.6 g, 0.9 mole). Mixing continues for three hours, after which the mixture is filtered to remove dicyclohexylurea, washed twice with water and dried over magnesium sulfate. A yield of 258 g is obtained.

Dioleyl aspartate

Dioleyl N-alpha-tertiary-butyloxycarbonyl aspartate (230 g, 0.30 mole) is dissolved in 1000 mL of dichloromethane and stirred with trifluoroacetic acid (45.6 g, 0.4 mole) at room temperature for two hours, followed by neutralization in an ice bath with an equivalent amount of triethylamine. 500 mL of water is added to dissolve the salts, the organic layer is separated, dried over magnesium sulfate and filtered. 177 g of dioleyl aspartate is obtained.

Bis-dioleylaspartyl adipate

Adipoyl chloride (26 g, 0.14 mole) and dioleyl aspartate (177 g, 0.26 mole) are combined in a 1000 mL flask fitted for vacuum take-off (attached to a potassium hydroxide trap) at 0° C. The mixture is then stirred for two hours at room temperature. Chromatographic analysis of the resultant oil on silica gel (eluent: 5% ethyl acetate in hexane) affords bisdioleylaspartyl adipate in 44% yield.

EXAMPLE 2

This example shows the preparation, from intermediates to final molecular composition, of a fat mimetic material of the invention, having the following structure:

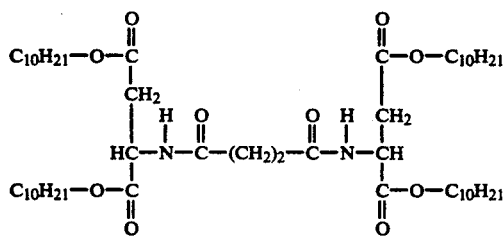

Didecyl N-alpha-tertiary-butyloxycarbonyl aspartate

N-alpha-tertiary-butyloxycarboxyl aspartic acid (91.5 g, 0.4 mole) and dicyclohexylcarbodiimide (245.1 g, 1.2 mole) are combined in a mixture of 2000 mL dichloromethane and 630 mL dimethylformamide. 4-dimethylaminopyridine (88.4 g, 0.72 mole) is then added, followed by decanol (142.5 g, 0.9 mole). Mixing continues for three hours, after which the mixture is filtered, washed with water and dried over magnesium sulfate. A yield of 187 g is obtained.

Didecyl aspartate

Didecyl N-alpha-tertiary-butyloxycarbonyl aspartate (187 g, 0.36 mole) is dissolved in 1000 ML of dichloromethane and stirred with trifluoroacetic acid (45.5 g, 0.4 mole) at room temperature for two hours, followed by neutralization in an ice bath with an equivalent amount of triethylamine. 500 mL of water is added to dissolve the salts, the organic layer is separated, dried over magnesium sulfate and filtered. 127 g of didecyl aspartate is obtained.

Bis-didecylaspartyl succinate

Succinyl chloride (23.2 g, 0.15 mole) and didecyl aspartate (127 g, 0.48 mole) are combined in a 1000 mL flask fitted for vacuum take-off (attached to a potassium hydroxide trap) at 0° C. The mixture is then stirred for two hours at room temperature. Chromatographic analysis of the resultant oil on silica gel (eluent: 5% ethyl acetate in hexane) affords bisdidecylaspartyl succinate in 51% yield.

EXAMPLE 3

This example shows the preparation, from intermediates to final molecular composition, of a fat mimetic material of the invention, having the following structure:

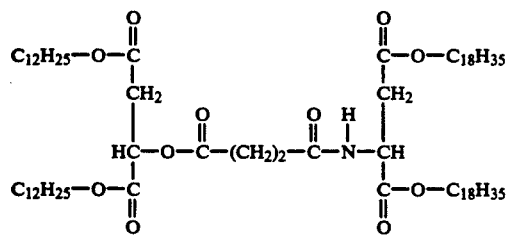

Dioleyl N-alpha-tertiary-butyloxycarbonyl aspartate

N-alpha-tertiary-butyloxycarbonyl aspartic acid (91.64 g, 0.4 mole) and dicyclohexylcarbodiimide (245.4 g, 1.2 mole) are combined in a mixture of 2000 mL dichloromethane and 630 mL dimethylformamide. 4-dimethylaminopyridine (88.4 g, 0.72 mole) is then added, followed by oleyl alcohol (242.6 g, 0.9 mole). Mixing continues for three hours, after which the mixture is filtered to remove dicyclohexylurea, washed twice with water and dried over magnesium sulfate. A yield of 234 g is obtained.

Dioleyl aspartate

Dioleyl N-alpha-tertiary-butyloxycarbonyl aspartate (234 g, 0.35 mole) is dissolved in 1000 mL of dichloromethane and stirred with trifluoroacetic acid (45.6 g, 0.4 mole) at room temperature for two hours, followed by neutralization in an ice bath with an equivalent amount of triethylamine. 500 mL of water is added to dissolve the salts, the organic layer is separated, dried over magnesium sulfate and filtered. 177 g of dioleyl aspartate is obtained.

Didodecyl malate

Trichloroacetic acid (13.2 g, 0.08 mole), D,L-malic acid (302.2 g, 2.25 mole) and dodecanol (931.9 g, 5.00 mole) are combined in a flask fitted with a vacuum distillation head. The mixture is warmed to 135° C. for 6.5 hours at 170 torr, and then cooled to room temperature. The product is distilled through a falling film still (168° C., 0.8 torr) to yield 935.6 g of a white solid, melting point of 27°–30° C.

Didodecyl 2-succinyl dioleyl aspartyl succinate

Succinyl chloride (23.2 g, 0.15 mole) is added through an additional funnel to a rapidly stirred mixture of dioleyl aspartate (94.5 g, 0.15 mole and didodecyl malate (70.5 g, 0.15 mole) at 0° C. in a flask fitted for vacuum take-off. The reaction is then stirred at room temperature for 2 hours. Chromatography of the resultant oil silica gel (eluent: 5% ethyl acetate in hexane) yielded didodecyl 2-succinyl dioleyl aspartyl succinate in 65% yield.

EXAMPLE 4

Sweet Chocolate. A low calorie sweet chocolate may be prepared by blending

| Ingredient | parts |
| --- | --- |
| Cocoa Powder | 1.0 |
| Sugar | 1.0 |
| To this is added a portion of | |
| Example 1 Fat Mimetic | 1.0 |

Mix thoroughly and pass through a refiner to reduce the particles to desired size. The material is conched, and the remaining fat mimetic is added. The mixture is poured into molds and quench cooled.

EXAMPLE 5

Chocolate Chips. The chocolate prepared in Example 4 is deposited into nibs and processed in the usual process.

EXAMPLE 6

Chocolate Chip Cookies. Reduced calorie crisp chocolate chip cookies may be prepared by blending

| Ingredient | parts |
| --- | --- |
| Flour | 22.0 |
| Example 1 Fat Mimetic | 20.0 |
| Salt | 0.7 |
| Sodium Bicarbonate | 0.1 |
| Monocalcium Phosphate | 0.1 |
| Vanillin | 0.1 |

-continued

| Ingredient | parts |
| --- | --- |
| Water | 8.0 |
| To this is added | |
| Sugar | 30.0 |
| which is mixed until dispersed. Then | |
| Example 5 Chocolate Chips | 19.0 | are added and mixed until just blended prior to depositing and baking in the usual process.

EXAMPLE 7

Chewy Chocolate Chip Cookies. Chewy chocolate chip cookies may be prepared by combining

| Ingredient | parts |
| --- | --- |
| Sugar | 24.3 |
| Invert Sugar | 20.0 |
| Flour | 13.7 |
| Example 2 Fat Mimetic | 13.0 |
| Frozen Whole Eggs | 2.0 |
| Sodium Bicarbonate | 0.1 |
| Monocalcium Phosphate | 0.1 |
| Vanillin | 0.1 |
| Water | 7.7 |
| To this is added | |
| Example 5 Chocolate Chips | 19.0 | and mixed until just dispersed prior to depositing and baking in the usual process.

EXAMPLE 8

Sandwich Cookies. A base cake may be prepared by combining

| Ingredient | parts |
| --- | --- |
| Flour | 48.0 |
| High Fructose Corn Syrup | 12.0 |
| Sugar (6X) | 10.0 |
| Example 1 Fat Mimetic | 10.0 |
| Dutch Cocoa | 5.0 |
| Corn Syrup (42 D.E.) | 3.0 |
| Dextrose | 2.0 |
| Frozen Whole Eggs | 2.0 |
| Salt | 0.3 |
| Sodium Bicarbonate | 0.2 |
| Lecithin | 0.2 |
| Vanilla | 0.2 |
| Ammonium Bicarbonate | 0.1 |
| Water | 7.0 | mixing well, rotary molding, baking, and cooling. A filler may be prepared by melting

| Ingredient | parts |
| --- | --- |
| Example 2 Fat Mimetic | 37.0 |
| and adding | |
| Sugar 10X | 62.7 |
| Vanillin | 0.3 |

Cool filler to 78° F. and sandwich between base cakes in a ratio of 1 to 3.

EXAMPLE 9

Vanilla Wafers. Vanilla wafers may be prepared by combining and mixing well

| Ingredient | parts |
| --- | --- |
| Flour | 40.0 |
| Sugar (10X) | 28.0 |
| Example 2 Fat Mimetic | 13.0 |
| Frozen Whole Eggs | 6.0 |
| High Fructose Corn Syrup | 4.0 |
| Salt | 0.7 |
| Vanilla | 0.3 |
| Sodium Bicarbonate | 0.3 |
| Sodium Aluminum Phosphate | 0.1 |
| Ammonium Bicarbonate | 0.1 |
| Water | 7.5 | aerating, and depositing onto a baking surface and baking in the usual manner.

EXAMPLE 10

White Layer Cake. A white layer cake may be prepared by combining

| Ingredient | parts |
| --- | --- |
| Sugar | 30.0 |
| Flour | 25.0 |
| Frozen Whole Eggs | 16.0 |
| Example 2 Fat Mimetic | 14.7 |
| Nonfat Dry Milk | 13.0 |
| Sodium Bicarbonate | 0.7 |
| Vanilla | 0.4 |
| Salt | 0.2 | mixing well, panning off, and baking in the usual process.

EXAMPLE 11

Chocolate Icing. Chocolate icing may be prepared by blending, being careful not to incorporate air:

| Ingredient | parts |
| --- | --- |
| Sugar (12X) | 65.0 |
| Example 1 Fat Mimetic | 11.0 |
| Dutched Cocoa | 10.5 |
| Nonfat Dry Milk | 4.0 |
| Frozen Egg Yolk | 4.0 |
| Salt | 0.25 |
| Vanilla | 0.25 |
| Water | 5.0 |

The icing can be used immediately or packaged and frozen for later use.

EXAMPLE 12

Butter Cream Icing. Butter cream icing is prepared by blending:

| Ingredient | parts |
| --- | --- |
| Sugar | 227.0 |
| Example 1 Fat Mimetic | 70.8 |
| Water | 28.4 |
| Non Fat Dry Milk | 14.0 |
| Emulsifier | 1.4 |
| Salt | 1.0 |
| Vanilla | 1.0 |

All of the ingredients are creamed in a mixer at medium speed.

EXAMPLE 13

Pie Crust. A pie crust may be prepared by blending

| Ingredient | parts |
|---|---|
| Flour | 58.0 |
| Whey | 1.5 |
| Salt | 1.5 |
| Sodium Steroyl-2-Lactylate | 1.0 |
| To this is added | |
| Water | 7.0 |
| Example 2 Fat Mimetic | 26.0 |
| High Fructose Corn Syrup | 5.0 |

The dough is mixed until uniform prior to pressing into a pie plate and baking in the usual process.

EXAMPLE 14

Lemon Pie Filling. A pie filling may be prepared by premixing

| Ingredient | parts |
|---|---|
| Sugar (4X) | 17.5 |
| Unmodified Corn Starch | 2.0 |
| Modified Corn Starch | 1.8 |
| To this is added | |
| Water | 60.0 |
| then Corn Syrup | 11.5 |
| Example 3 Fat Mimetic | 4.3 |
| Lemon Powder | 1.0 |
| Lemon Puree | 1.0 |
| Dry Whole Egg | 0.5 |
| Citric Acid | 0.2 |
| Salt | 0.2 |

The mixture is heated to starch gelatinization temperature and used immediately or canned.

EXAMPLE 15

Whipped Topping. A whipped topping may be prepared by premixing

| Ingredient | parts |
|---|---|
| Example 2 Fat Mimetic | 26.0 |
| with Mono- and Di-glycerides | 2.0 |

An aqueous phase is prepared by dissolving

| | |
|---|---|
| Water | 46.6 |
| Sugar (4X) | 23.0 |
| Dextrose | 1.0 |
| Polysorbate 60 | 0.7 |
| Sorbitan Monostearate | 0.3 |
| Carageenan | 0.2 |
| Guar Gum | 0.1 |
| Vanilla | 0.1 |

The oil blend is then added to the aqueous phase with high agitation. The topping can be packaged and refrigerated or frozen.

EXAMPLE 16

Pudding. Pudding can be prepared from the following formulation:

| Ingredient | parts |
|---|---|
| Milk | 67 |
| Sugar | 11 |
| Starch | 5 |
| Water | 9 |
| Flavor | 3 |
| Example 2 Fat Mimetic | 5 |

The ingredients can be blended together and heated to form a pudding.

EXAMPLE 17

Soda Crackers. Soda crackers may be prepared by pre-mixing ¼ of

| Ingredient | parts |
|---|---|
| Flour | 70.0 |
| Yeast | 0.2 | and sufficient water to make a dough. This is fermented for 24 hours. To the remaing flour and yeast, the following is added blended:

| | |
|---|---|
| Water | 20.0 |
| Malt Syrup | 0.69 |
| Sodium Bicarbonate | 0.40 |
| Malt | 0.01 |
| After the ferment is added and mixed again, the blend is proofed for 8 hours, sheeted, and baked. | |
| Afterwards, | |
| Example 2 Fat Mimetic | 7.0 |
| Salt | 1.7 | prior to packaging.

EXAMPLE 18

Sprayed Crackers. A dough prepared from

| Ingredient | parts |
|---|---|
| Flour | 100.0 |
| Sugar | 5.0 |
| Malt | 1.5 |
| Example 1 Fat Mimetic | 7.5 |
| Salt | 1.0 |
| Sodium Bicarbonate | 0.9 |
| Nonfat Dry Milk | 2.5 |
| High Fructose | 2.5 |
| Monocalcium Phosphate | 0.75 |
| Water | 28.0 | is sheeted, stamped, and baked to produce a cracker product, then sprayed with the Example 1 Fat Mimetic prior to packaging.

EXAMPLE 19

Peanut Butter. Peanut Butter may be prepared by mixing

| Ingredient | parts |
|---|---|
| Example 1 Fat Mimetic | 35.0 |
| Peanut Flavor | 2.0 |
| Corn Syrup Solids | 12.0 |
| Salt | 1.0 |
| High Fructose Corn Syrup | 10.0 |
| and added while agitating. When well blended, add | |
| Defatted Peanut Flour | 40.0 | mix and package.

EXAMPLE 20

Ice Cream. Vanilla ice cream may be prepared by mixing

| Ingredient | parts |
|---|---|
| Sugar (10X) | 15.0 |
| Nonfat Dry Milk | 3.9 |
| Salt | 0.4 |
| into Water | 39.0 |
| for 3 minutes. Then add melted | |
| Example 2 Fat Mimetic | 28.4 | and cook to 200° F. while mixing. Hold for one minute. Cool to 160° F., and add

| | |
|---|---|
| Sugared Egg Yolks | 12.5 |
| Vanilla Extract | 0.8 | and mix one minute. Cool and freeze to desired overrun.

EXAMPLE 21

Filled Cream. To make a "filled cream" composition, homogenize about

| Ingredient | parts |
|---|---|
| Example 2 Fat Mimetic | 30.0 |
| Skim Milk | 69.9 |
| Polysorbate 80 | 0.1 | in a conventional dairy homogenizer.

EXAMPLE 22

Filled Milk. To prepare a "filled milk" composition, combine about

| Ingredient | parts |
|---|---|
| Example 21 Filled Cream | 10.0 |
| Skim Milk | 90.0 | and rehomogenize.

EXAMPLE 23

Low Calorie Milk. A low calorie "whole milk" may be prepared by combining

| Ingredient | parts |
|---|---|
| Nonfat Milk | 96.4 |
| Example 1 Fat Mimetic | 3.5 |
| Lecithin | 0.1 | mixing and homogenizing.

EXAMPLE 24

Cream Cheese. To make an imitation cream cheese, add

| Ingredient | parts |
|---|---|
| Water | 53.0 |
| Calcium Caseinate | 6.7 |
| Buttermilk Powder | 3.9 |
| Emulsifiers | 0.2 |
| Xanthan Gum | 0.2 | and mix three minutes. Melt

| Ingredient | parts |
|---|---|
| Example 1 Fat Mimetic | 35.5 | and cook to 200° F. while mixing. Hold for one minute. Then cool to 150° F. and add

| | |
|---|---|
| Flavor, Acid, and Color | 0.5 | and mix one minute. Fill, then cool and store.

EXAMPLE 25

Cheddar-Style Cheese. To make Cheddar-style cheese, homogenize

| Ingredient | parts |
|---|---|
| Nonfat Milk | 75.0 |
| Low Temperature Nonfat Dry Milk | 4.0 |
| Example 1 Fat Mimetic | 20.0 |
| To this is added | |
| Salt | 0.7 |
| Lactic Acid Culture | 0.3 |

The mixture is fermented and pressed to a final composition of approximately 37.0% moisture, 63.0% total solids, and 32.0% fat mimetic.

EXAMPLE 26

Process Pimento Cheese Food. Processed pimento cheese food may be prepared by melting

| Ingredient | parts |
|---|---|
| Example 25 Cheddar Cheese | 43.0 |
| and Swiss Cheese | 44.0 |
| Into this is blended | |
| Dehydrated Pimento | 0.3 |
| and Water | 12.7, | and the mixture is cased into blocks.

EXAMPLE 27

Imitation Sour Cream. An imitation sour cream may be prepared by adding

| Ingredient | parts |
|---|---|
| Water | 75.8 |
| to Modified Starch | 2.0 |
| Avicel | 1.0 |
| Distilled Monoglyceride | 0.7 |
| and Polysorbate 60 | 0.3 |
| and mixing three minutes. To this is added | |
| Example 2 Fat Mimetic | 16.5 |
| Condensed Skim Milk | 3.5, | and the mixture is mixed three minutes, cooked to 195° F., and held five minutes. This may then be cooled to 60° F., and

| | |
|---|---|
| Flavors and Acids | 0.2 | added, followed by filling in the usual process.

EXAMPLE 28

Mayonnaise. Mayonnaise may be prepared by adding

| Ingredient | parts |
|---|---|
| Water | 5.0 |
| Sugar | 1.5 |
| and Spices | 3.5 |
| and mixing three minutes. To this is added | |
| Salted Egg Yolks | 8.0 |
| followed by mixing two minutes, adding | |
| Example 1 Fat Mimetic | 80.0 |
| then 120 Distilled Vinegar | 2.0 |

The mixture is blended three minutes and passed through a colloid mill set at 60 prior to filling in the usual process.

EXAMPLE 29

Salad Dressing. Salad dressing may be prepared by adding

| Ingredient | parts |
|---|---|
| Water | 29.0 |
| to Sugar | 12.0 |
| and Spices | 4.5 | and mixing three minutes. Then

| | |
|---|---|
| Salted Egg Yolks | 5.5 |
| and Modified Starch | 3.0 | are added and mixed two minutes. To the aqueous mixture are added

| | |
|---|---|
| Example 3 Fat Mimetic | 40.0 |
| then 120 Distilled Vinegar | 6.0 |

The mixture is then mixed three minutes and passed through a colloid mill set at 60 prior to filling the usual process.

EXAMPLE 30

Italian Dressing. To make Italian dressing, add

| Ingredient | parts |
|---|---|
| Sugar | 4.0 |
| Xanthan Gum | 0.12 |
| to Water | 21.5 |
| at 125–130° F. and mix three minutes. Then add | |
| Garlic Vinegar Puree | 1.5 |
| Lemon Juice | 4.0 |
| White Vinegar (120) | 13.0 |
| and mix three minutes. Add | |
| Salt | 4.5 |
| Minced Garlic | 0.75 |
| Minced Onion | 0.50 |
| Red Bell Pepper | 0.05 |
| B.I. Spice Blend | 0.08 |
| and mix three minutes. Fill this aqueous phase 50% by weight with | |
| Example 1 Fat Mimetic | 50.0 | by weight.

EXAMPLE 31

French Dressing. French dressing may be prepared by adding

| Ingredient | parts |
|---|---|
| Water | 31.09 |
| to Sugar | 15.00 |
| Salt | 2.50 |
| Spices | 2.40 |
| Xanthan Gum | 0.25 |
| Alginate | 0.14 |
| Polysorbate 60 | 0.12 |
| and mixing three minutes. Then | |
| 120 Distilled Vinegar | 12.00 |
| and Example 1 Fat Mimetic | 36.50 | are added, mixed three minutes, and homogenized at 500 psi prior to filling in the usual process.

EXAMPLE 32

Dijon Mustard. A dijon-style mustard may be prepared by combining

| Ingredient | parts |
|---|---|
| Dry White Wine | 66.1 |
| with Water | 5.0 | and bringing to a boil. To this aqueous phase is added

| Ingredient | Parts |
|---|---|
| Ground, Defatted, Yellow Mustard Seed | 12.4 |
| Example 1 Fat Mimetic | 6.1 |
| Honey | 6.6 |
| Onion Powder | 2.0 |
| Salt | 1.3 |
| Garlic Powder | 0.3 |
| Mustard Oleo Resin | 0.2 |

The mixture is well blended, pasteurized, and packaged.

EXAMPLE 33

Margarine. A margarine may be prepared by emulsifying

| | parts |
|---|---|
| Oil Phase Ingredients | |
| Example 3 Fat Mimetic | 68.6 |
| Liquid Corn Oil | 0.55 |
| Partially Hydrogenated Corn Oil | 0.45 |
| Lecithin | 0.30 |
| Mono- and Di-Glycerides | 0.21 |
| Margarine Flavor and Color | 0.0062 |
| with Aqueous Phase Ingredients | |
| Water | 25.8 |
| Whey | 1.00 |
| Salt | 2.00 |
| Sodium Benzoate | 0.086 |
| Potassium Sorbate | 0.066 |
| CaEDTA | 0.0015 | and passing the emulsion through a cool scraped surface heat exchanger in the usual process.

EXAMPLE 34

Low Fat Spread. A table spread may be prepared by emulsifying

| Oil Phase Ingredients | parts |
|---|---|
| Example 1 Fat Mimetic | 59.58 |
| Lecithin | 0.20 |
| Monoglycerides from 5 IV Hydrogenated Soybean Oil | 0.20 |
| Beta-carotene and Vitamin A Palmitate in Corn Oil | 0.005 |
| Flavor | 0.010 |
| with Aqueous Phase Ingredients | |
| Water | 36.865 |
| Salt | 2.00 |
| Whey | 1.00 |
| Potassium Sorbate | 0.10 |
| Phosphoric Acid | 0.04 | and passing the emulsion through a cool scraped surface heat exchanger in the usual process.

EXAMPLE 35

Shortening. A shortening may be prepared by mixing

| Ingredient | parts |
|---|---|
| Example 1 Fat Mimetic | 95.0 |
| with Soybean Oil (70 IV) Mono- and Diglycerides | 5.0 |

EXAMPLE 36

Puff Pastry Shortening. A puff pastry shortening may be prepared by homgenizing

| Ingredient | parts |
|---|---|
| Example 1 Fat Mimetic | 68.0 |
| Example 2 Fat Mimetic | 22.0 |
| Soybean Lecithin | 0.1 |
| Mono- and Diglycerides (0 IV) | 0.2 |
| with Water | 8.2 |
| Salt | 1.5 |

EXAMPLE 37

Frying Oil. A frying oil may be prepared by adding one ppm polydimethylsiloxane to the Fat Mimetic of Example 1.

EXAMPLE 38

Potato Chips. Whole peeled potatoes may be sliced, washed in water, and fried in the frying oil of Example 36 at 375° F. to desired color. The excess oil is shaken off and the chips are salted. The finished product contains about 35% fat mimetic.

EXAMPLE 39

Bologna. To make bologna, chop together

| Ingredient | parts |
|---|---|
| Boneless Mutton | 40.0 |
| Pork Hearts | 15.0 |
| Beef Trimmings (75/25) | 10.0 |
| Pork Blade Meat | 5.0 |
| adding ice to control temperature. Then add | |
| Seasoning | 7.0 |
| Example 1 Fat Mimetic | 13.0 |
| and Water/Ice | 10.0 |

The mixture can be stuffed into casings, smoked, and packaged.

EXAMPLE 40

Italian Sausage. To make Italian sausage, chop

| Ingredient | parts |
|---|---|
| Lean Beef | 52.6 |
| Lean Pork | 26.3 |
| together. Pre-blend | |
| Example 1 Fat Mimetic | 9.8 |
| Salt | 1.7 |
| Chili Powder | 1.3 |
| Paprika | 0.9 |
| Coriander | 0.01 |
| Nutmeg | 0.01 |
| Ground Caraway | 0.005 |
| Celery | 0.005 |
| and add to meats. Add | |
| Pimento | 7.37 | with juice and chop until well mixed. Grind through ⅜" plate, stuff into casings and cook at 150° F. for 30 minutes. Smoke and package.

EXAMPLE 41

Cubed Soup Stock. To make cubed soup stock, blend

| Ingredient | parts |
|---|---|
| Salt | 67.0 |
| Dry Beef Broth | 25.0 |
| Celery Salt | 1.0 |
| melt | |
| Example 2 Fat Mimetic | 7.0 | and spray into the mixing dry ingredients. Press into cubes and package.

EXAMPLE 42

Pet Food. A dry pet food may be prepared by mixing

| Ingredient | parts |
|---|---|
| Ground Wheat Middlings | 56.9 |
| Meat and Bone Meal | 15.0 |
| Defatted Soya Meal | 15.0 |
| Sugar | 3.0 |
| Sodium Aluminum Phosphate | 0.4 |
| Sodium Bicarbonate | 0.4 |
| Vitamin Mix | 0.2 |
| To this is added | |
| Example 1 Fat Mimetic | 1.0 | and water sufficient for processing. The ingredients are remixed and cooker extruded. The product is baked/dried to approximately 2.5% moisture and surface coated with

| Example 1 Fat Mimetic | 9.0 |
|---|---| prior to packaging.

EXAMPLE 43

Breakfast Sausage. To make breakfast sausage, premix

| Ingredient | parts |
| --- | --- |
| Salt | 1.7 |
| White Pepper | 0.34 |
| Sugar | 0.18 |
| Sage | 0.17 |
| Ginger | 0.06 |
| Cardamon | 0.02 |
| Marjoram | 0.02 |
| Savory | 0.01 |
| chop | |
| Trimmed Cali Pork Butts | 45.0 |
| Example 2 Fat Mimetic | 35.0 |
| Ham Fat | 17.5 | with spices until blended. Grind through 3/16" plate. Package and refrigerate until use.

EXAMPLE 44

Corn Puff Cereal. To make corn puff cereal, mix

| Ingredient | parts |
| --- | --- |
| Corn Flour | 48.5 |
| Defatted Corn Bran | 25.0 |
| Sugar (4X) | 7.5 |
| Rice Flour | 6.0 |
| together. To this is added | |
| Example 1 Fat Mimetic | 5.5 |
| Honey | 7.5 |

The mixture is blended until uniform, cooker extruded to desired shape, and dried to a moisture content of approximately 2% prior to packaging.

EXAMPLE 45

Dry Pancake Mix. A dry pancake mix may be prepared by combining

| Ingredient | parts |
| --- | --- |
| Soft Wheat Flour | 58.0 |
| Corn Flour | 11.0 |
| Rye Flour | 10.0 |
| Sugar (6X) | 7.0 |
| Nonfat Dry Milk | 3.5 |
| Sodium Bicarbonate | 1.8 |
| Sodium Acid Pyrophosphate | 1.5 |
| Dry Whole Egg | 1.0 |
| Monocalcium Phosphate | 0.2 |
| then | |
| Example 1 Fat Mimetic | 6.0 | is sprayed onto the dry ingredients as they mix. The mixture is then blended and packaged.

EXAMPLE 46

Bread. To make bread, combine

| Ingredient | parts |
| --- | --- |
| Flour | 52.0 |
| Water | 32.0 |
| Sugar | 5.0 |
| Example 2 Fat Mimetic | 4.7 |
| Yeast | 2.5 |
| Nonfat Dairy Milk | 2.5 |
| Salt | 1.3 |

The mixture is proofed four hours, punched down, panned, and proofed until desired volume is achieved prior to baking, slicing, and packaging in the usual manner.

EXAMPLE 47

Heat and Serve Rolls. To make heat and serve rolls, combine

| Ingredient | parts |
| --- | --- |
| Sugar | 5.7 |
| Example 2 Fat Mimetic | 5.7 |
| Frozen Whole Eggs | 2.9 |
| Nonfat Dry Milk | 1.9 |
| Yeast | 1.4 |
| Salt | 0.9 |
| Water | 33.5 |
| and blend well. Add | |
| Flour | 48.0 | and mix. Proof for four hours. De-gas, divide into rolls, package, and freeze.

EXAMPLE 48

Coffee Whitener. A coffee whitener may be prepared by premixing

| Ingredient | parts |
| --- | --- |
| Corn Syrup Solids | 43.0 |
| Sodium Caseinate | 8.7 |
| Mono- and Diglycerides | 3.0 |
| Dipotassium Phosphate | 1.0 |
| Vanillin | 0.2 |
| while blending continues | |
| Example 1 Fat Mimetic | 44.0 |
| Butter Flavor | 0.1 | are added, and the mixture is packaged.

EXAMPLE 49

Fudge Base. A fudge base suitable as a milk mix (or topping) may be prepared by mixing

| Ingredient | parts |
| --- | --- |
| Corn Syrup | 26.0 |
| Corn Starch | 2.0 |
| Vanilla | 2.0 |
| To this is added | |
| Cocoa Powder | 25.0 |
| Example 2 Fat Mimetic | 30.0 |
| Example 3 Fat Mimetic | 15.0 |

The mixture is blended well and heated to pasteurizing temperature before packaging.

EXAMPLE 50

Caramel. To make caramel, mix

| Ingredient | parts |
| --- | --- |
| Sugar (4X) | 11.0 |
| Invert Sugar | 10.0 |
| Condensed Skim Milk | 30.0 |
| then Corn Syrup (64 D.E.) | 40.00 |
| Example 2 Fat Mimetic | 8.0 |
| Salt | 1.0 |

Cook to about 240° F. and cast into a final product or use as an ingredient in other confections.

EXAMPLE 51

Bubble Gum. A gum base may be made by melting together

| Ingredient | parts |
| --- | --- |
| Gum Resin | 35 |
| Calcium Carbonate Filler | 30 |
| Example 2 Fat Mimetic | 23 |
| Elastomer | 12 |
| to 25% of the base add | |
| Corn Syrup (63 D.E.) | 20 |
| Glycerol | 5 |
| Sugar (12X) | 49 |
| Color and Flavor | 1 |

The mixture can be cooled and cut to size

EXAMPLE 52

Milk Liqueur. To make a shelf stable milk liqueur, blend

| Ingredient | parts |
| --- | --- |
| Sugar | 21.0 |
| Water | 79.0 |
| until dissolved. To 25% of this sugar solution, add | |
| Ethanol | 47.0 |
| Water | 28.0 |
| to make a liqueur stock. To make the milk liqueur, mix | |
| Liqueur Stock | 90.90907 |
| Nonfat Milk | 7.90513 |
| Example 1 Fat Mimetic | 1.18577 |
| Orange Oil | 0.000016 |
| Cinnamon Oil | 0.000008 |
| Anise Oil | 0.000004 |
| Clove Oil | 0.000004 |
| Rose Oil | 0.000004 |

Mix, homogenize, and bottle.

It is to be understood that the above examples are given by way of illustration only and are not to be construed as limiting the invention.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. An edible composition comprising a fat mimetic compound of the formula:

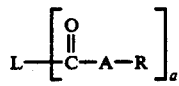

where
L is a substituted or unsubstituted aliphatic or alicyclic group having 1 to 8 carbons;
each A is, independently, NQ or oxygen, where at least one A is NQ;
each R is, independently, $-BR'_b$;
a is 2 to 8;
each b is, independently, 1 to 17;
each Q is, independently, an aliphatic group or hydrogen;
each B is, independently, a straight, branched-chain, or cyclic backbone chain having from 2 to 8 carbons;
each R', is, independently,

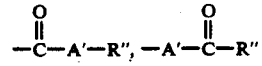

or $-O-R''$;
each R'' is, independently, an aliphatic group having 1 to 30 carbons, $-CH(CH_3)CH_2O-R'''$ or $-CH_2CH(CH_3)O-R'''$, where R''' is an aliphatic group having 1 to 30 carbons; and
each A' is, independently, NQ or oxygen.

2. A compound according to claim 1 wherein a is 2.

3. A compound according to claim 2 wherein at least one A is $-NH-$.

4. A compound according to claim 2 wherein each A is $-NH-$.

5. A compound according to claim 1 wherein b is 1 to 3.

6. A compound according to claim 5 wherein each R is, independently, selected from the group consisting of

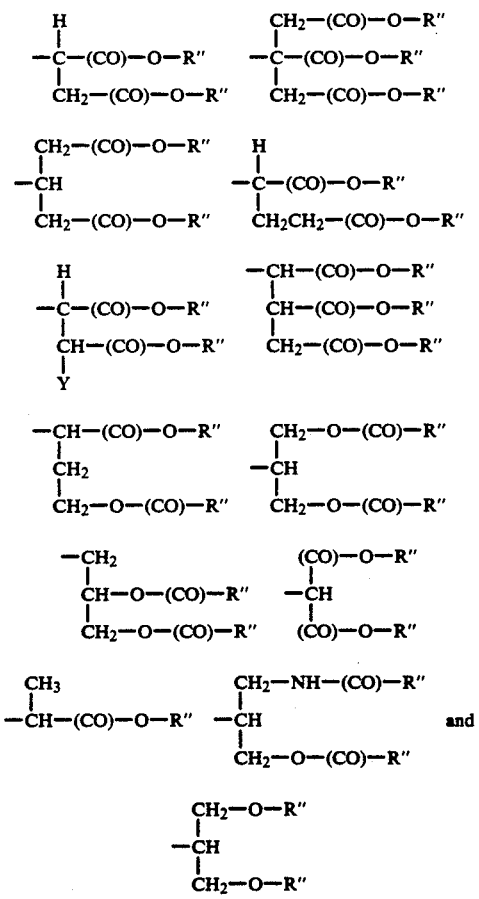

where
each R'' is, independently, an aliphatic group having 1 to 30 carbons, $-CH(CH_3)CH_2O-R'''$ or $-CH_2CH(CH_3)O-R'''$;
R''' is an aliphatic group having 1 to 30 carbons; and Y is —(CO)—O—R" or —O—(CO)—R".

7. A compound according to claim 6 wherein each R", independently, has 8 to 22 carbons.

8. A compound according to claim 7 wherein each R" is, independently, derived from fatty acids selected from the group consisting of acetic, propionic, butyric, caproic, caprylic, pelargonic, capric, undecanoic, lauric, myristic, palmitic, margaric, stearic, arachidic, behenic, lignoceric, cerotic, montanic, mellissic, palmitoleic, oleic, vaccenic, linoleic, linolenic, oleostearic, arachidonic, nervonic, eicosapentaenoic, decosatetraenoic, decosapentaenoic, decosahexaenoic, and their alcohol counterparts.

9. The compound of claim 7 wherein each R", is, independently derived from an oil selected from the group consisting of non-hydrogenated, partially hydrogenated, or fully hydrogenated soybean, safflower, sunflower, high oleic sunflower, sesame, peanut, corn, olive, rice bran, canola, babassu nut, coconut, palm, palm kernel, lupin, nasturtium seed, mustard seed, cottonseed, rapeseed, low erucic rapeseed, butter or marine oils, and plant waxes.

10. The compound of claim 7 wherein each R" is, independently, derived from tallow o lard.

11. A method for reducing the available calories in a food composition having an edible fat component, which method comprises replacing at least a portion of the edible fat with a fat mimetic compound of the formula:

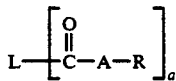

where
L is a substituted or unsubstituted aliphatic or alicyclic group having 1 to 8 carbons;
each A is, independently, NQ or oxygen, where at least one A is NQ;
each R is, independently, —BR'$_b$;
a is 2 to 8;
each b is, independently, 1 to 17;
each Q is, independently, hydrogen or an aliphatic group;
each B is, independently, a straight, branched-chain, or cyclic backbone chain having from 2 to 8 carbons;
each R' is, independently,

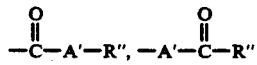

or O—R;
each R" is, independently, an aliphatic group having 1 to 30 carbons, —CH(CH$_3$)CH$_2$O—R''' or —CH$_2$CH(CH$_3$)O—R''', where R''' is an aliphatic group having 1 to 30 carbons; and
each A' is, independently, NQ or oxygen.

12. A method according to claim 11 wherein a is 2.

13. A method according to claim 12 wherein on A is —NH—.

14. A method according to claim 12 wherein each A is —NH—.

15. A compound according to claim 11 wherein b is 1 to 3.

16. A compound according to claim 15 wherein each R is, independently, selected from the group consisting of

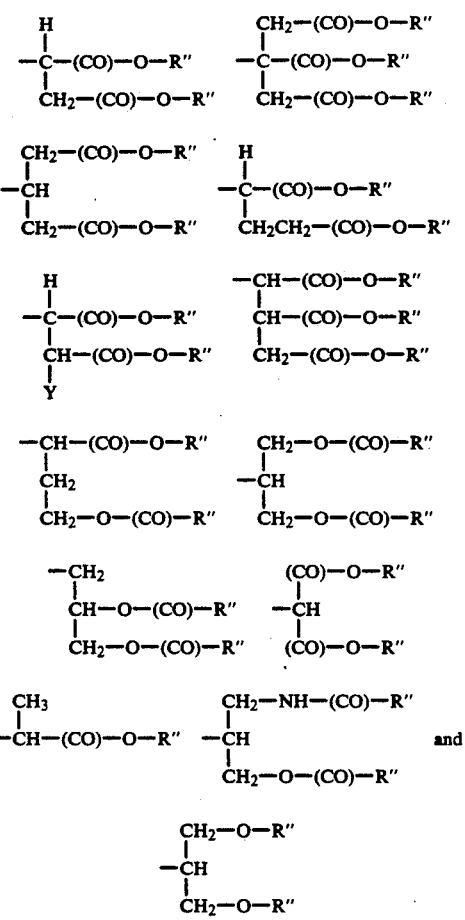

where
each R" is, independently, an aliphatic group having 1 to 30 carbons, —CH(CH$_3$)CH$_2$O—R''' or —CH$_2$CH(CH$_3$)O—R''';
R''' is an aliphatic group having 1 to 30 carbons; and
Y is —(CO)—O—R", or —O—(CO)—R".

17. A compound according to claim 16 wherein each R", independently, has 8 to 22 carbons.

18. A method according to claim 17 wherein each R" is, independently, derived from fatty acids selected from the group consisting of acetic, propionic, butyric, caproic, caprylic, pelargonic, capric, undecanoic, lauric, myristic, palmitic, margaric, stearic, arachidic, behenic, lignoceric, cerotic, montanic, mellissic, palmitoleic, oleic, vaccenic, linoleic, linolenic, oleostearic, arachidonic, nervonic, eicosapentaenoic, decosatetraenoic, decosapentaenoic, decosahexaenoic, and their alcohol counterparts.

19. The method of claim 17 wherein each R" is, independently, derived from an oil selected from the group consisting of non-hydrogenated, partially hydrogenated, or fully hydrogenated soybean, safflower, sunflower, high oleic sunflower, sesame, peanut, corn, olive, rice bran, canola, babassu nut, coconut, palm, palm kernel, lupin, nasturtium seed, mustard seed, cottonseed, rapeseed, low erucic rapeseed, butter or marine oils, and plant waxes.

20. The method of claim 17 wherein R" is derived from tallow or lard.

21. In a food product containing a digestible fat ingredient, the improvement being wherein at least a portion of the digestible fat ingredient is replaced by a fat mimetic compound according to claim 1.

22. The food product according to claim 21, wherein said food product is selected from the group consisting of frozen desserts, puddings, whipped toppings, margarine substitutes or blends, flavored bread or biscuit spreads, sour cream, mayonnaise, salad dressing, mustard, cheese products, filled dairy products, ice cream mixes, dried coffee lighteners, flavored dips, pancake mixes, egg substitutes, frying fats and oils, bakery products, cereals, soup stock, icings, fillings, pet food, candy, liqueurs, potato chips, and meat substitutes or extenders.

* * * * *